United States Patent [19]

Mukai

[11] Patent Number: 4,768,099

[45] Date of Patent: Aug. 30, 1988

[54] METHOD OF STORING AND REPRODUCING A MEDICAL IMAGE IN WHICH IMAGE DATA IS STORED WITH CORRESPONDING INFORMATION REPRESENTING IMAGE PROCESSING CONDITIONS

[75] Inventor: Hachiro Mukai, Kanagawa, Japan

[73] Assignee: Fuji Photo Film Co., Ltd., Kanagawa, Japan

[21] Appl. No.: 67,177

[22] Filed: Jun. 29, 1987

[30] Foreign Application Priority Data

Jun. 27, 1986 [JP] Japan ................................ 61-150711

[51] Int. Cl.$^4$ ........................ H04N 1/32; H04N 1/00; H04N 1/40
[52] U.S. Cl. .................................. 358/257; 358/256; 358/280; 358/284
[58] Field of Search ............... 358/256, 257, 280, 284, 358/282, 285, 293, 294

[56] References Cited

U.S. PATENT DOCUMENTS

| | | | |
|---|---|---|---|
| 4,258,264 | 3/1981 | Kotera et al. | 358/289 |
| 4,437,127 | 3/1984 | Hirose | 358/257 |
| 4,591,922 | 5/1986 | Takano et al. | 358/280 |
| 4,604,653 | 8/1986 | Shimizu | 358/280 |
| 4,611,247 | 9/1986 | Ishida et al. | 358/280 |
| 4,652,999 | 3/1987 | Higashi et al. | 358/280 |

FOREIGN PATENT DOCUMENTS

| | | | |
|---|---|---|---|
| 56-2779 | 1/1981 | Japan | 358/280 |
| 58-6642 | 1/1983 | Japan | 358/257 |

*Primary Examiner*—James J. Groody
*Assistant Examiner*—Randall S. Svihla
*Attorney, Agent, or Firm*—Sughrue, Mion, Zinn, Macpeak & Seas

[57] ABSTRACT

A method of filing and reproducing a medical image comprises the steps of feeding image signals representing a medical image to an image processing apparatus and an image filing apparatus, reproducing the medical image as a visible image by feeding the image signals processed in the image processing apparatus to an image output apparatus and, on the other hand, filing the image signals on a recording medium in the image filing apparatus retrievably and transferably to the image output apparatus. Image processing information representing image processing conditions in the image processing apparatus are fed to the image filing apparatus and stored on the recording medium in conformity with the image signals which are to be processed by use of the image processing conditions. In the course of reading out the image signals from the recording medium and feeding them to the image output apparatus, they are sent to the image processing apparatus, the corresponding image processing information is read out, and the image processing conditions which the image processing information represent is set in the image processing apparatus.

4 Claims, 2 Drawing Sheets

METHOD OF STORING AND REPRODUCING A MEDICAL IMAGE IN WHICH IMAGE DATA IS STORED WITH CORRESPONDING INFORMATION REPRESENTING IMAGE PROCESSING CONDITIONS

BACKGROUND OF THE INVENTION

1. Field of the Invention

This invention relates to a method of filing and reproducing a medical image for reproducing a medical image such as a radiation image as a visible image based on image signals by an image output apparatus and feeding the image signals to an image filing apparatus to file them on a recording medium such as an optical disk.

2. Description of the Prior Art

Many medical images have heretofore been utilized for medical treatment or research in, for example, medical facilities such as hospitals. Most of the medical images are radiation images. In recent years, many computed tomography (CT) images, magnetic resonance (MR) images and the like are also utilized.

The medical images should be stored for investigating changes in diseases or wounds of patients, and it is legally stipulated that the medical images can be stored for a predetermined period. Therefore, in hospitals or the like, the number of stored medical images increases from day to day. The medical images have heretofore been stored in the form of hard copies. However, storage as hard copies requires a large storage space and burdensome operations for control and retrieval of the medical images in hospitals or the like.

Accordingly, in recent years, it has been proposed to employ an electronic filing method in which medical images are retrievably filed as image signals on a recording medium such as an optical disk or a magnetic disk. In the case where the medical images are filed in this manner on the recording medium, the space requirement and the burden of image storage are lightened, and the operation of image retrieval becomes easy and quick. In the case where radiation images are filed as mentioned above, a radiation image recording and reproducing system using a stimulable phosphor sheet as proposed in, for example, U.S. Pat. No. 4,258,264 and Japanese Unexamined Patent Publication No. 56(1981)-11395 may be utilized. Specifically, with the proposed radiation image recording and reproducing system, a radiation image stored on the stimulable phosphor sheet is detected directly as electric signals. Therefore, it is not necessary to generate electric image signals by reading out hard copies of medical images for the purpose of filing. This is very advantageous in practice.

The image signals obtained by an apparatus for reading out the radiation image from the stimulable phosphor sheet, a CT scanner or the like are sent to an image filing apparatus. In general, the image signals are also sent immediately to an image output apparatus and utilized for immediately reproducing the image for use in medical diagnosis.

However, in the case where a medical image is filed and reproduced in the manner as mentioned above, the image quality often differs between the medical image immediately reproduced by use of the image signals obtained by the radiation image read-out apparatus, the CT scanner or the like and the medical image reproduced by use of the same image signals read from the recording medium of the image filing apparatus (the latter reproduction of the medical image will hereinafter be referred to as re-output of the medical image). This is because image processing conditions differ between the case where the medical image is reproduced immediately as mentioned above and the case where the medical image is retrieved and re-output.

The aforesaid problems will hereinbelow be described in detail. In general, before the image signals representing a medical image are sent to the image output apparatus, they are fed to an image processing apparatus and subjected to an image processing such as a gradation processing or a frequency response processing for improving the image quality of the reproduced visible image, particularly for diagnostic efficiency and accuracy. In the case where the medical image is reproduced immediately as mentioned above, the image signals representing the medical image are of course passed through the image processing apparatus. On the other hand, the raw image signals which have not been processed are sent to the image filing apparatus, and are processed later when they are read from the image filing apparatus and used for re-output of the image. Normally, the image processing conditions in the image processing apparatus are adjusted to various values so that optimal values can be selected in accordance with the image recording portion of an object, image recording conditions, for example, radiation energy, radiation dose, the type of a grid or a collimator, the type of the stimulable phosphor sheet, and the like, and/or the purpose of diagnosis. Therefore, the same image processing conditions are not always set for where the medical image is reproduced immediately and for where the medical image is re-output. The image processing conditions are rather set to different values for the two cases.

If the medical image is reproduced into visible images of image qualities that differ between the aforesaid two cases, it is not always possible to take a diagnosis with the visible images, and in the worst case, an incorrect diagnosis is made.

SUMMARY OF THE INVENTION

The primary object of the present invention is to provide a method of filing and reproducing a medical image so that visible images of the same image qualities are reproduced for where the image is reproduced immediately by use of the image signals and for where the image is re-output by reading the image signals filed in an image filing apparatus.

Another object of the present invention is to provide a method of filing and reproducing a medical image, which increases reliability of diagnosis using medical images.

The present invention provides, in a medical image filing and reproducing system for feeding image signals representing a medical image to an image processing apparatus and an image filing apparatus, reproducing the medical image as a visible image by feeding the image signals processed in the image processing apparatus to an image output apparatus and, on the other hand, filing the image signals fed to the image filing apparatus on a recording medium in the image filing apparatus so that the filed image signals are retrievable and transferable to the image output apparatus, a method of filing and reproducing a medical image, which comprises the steps of:

(i) feeding image processing information representing image processing conditions in said image processing apparatus to said image filing apparatus and storing said image processing information on said recording medium in conformity with said image signals which are to be processed by use of said image processing conditions, and (ii) in the course of reading out said image signals from said recording medium and feeding said image signals to said image output apparatus, sending said image signals to said image processing apparatus, reading out said image processing information stored in conformity with said image signals, and setting the image processing conditions, which said image processing information represents, in said image processing apparatus.

With the method of filing and reproducing a medical image in accordance with the present invention wherein the image processing conditions are recorded on the recording medium in the image filing apparatus, and read out and set when the image is to be re-output, the same image processing conditions as those used when the image was reproduced immediately by use of the image signals are used in the image re-output step. Therefore, it is possible to obtain visible images having exactly the same image qualities in the case where the medical image is reproduced immediately after the image signals representing the medical image are fed as in the case where the image signals are filed and re-output. As a result, it becomes possible to increase the reliability of diagnosis using the medical images.

DESCRIPTION OF THE PREFERRED EMBODIMENTS

The present invention will hereinbelow be described in further detail with reference to the accompanying drawings.

Figure 1:
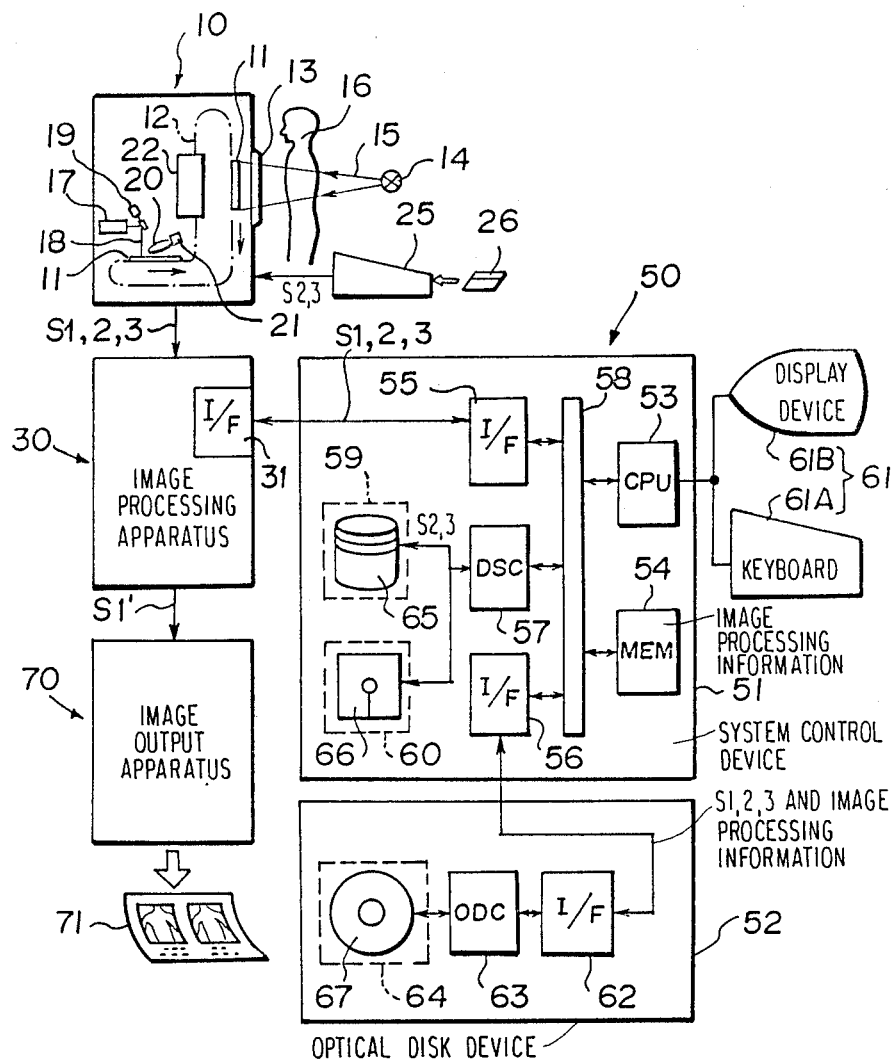
FIG. 1 is a schematic view showing an example of the medical image filing and reproducing system for carrying out an embodiment of the method of filing and reproducing a medical image in accordance with the present invention.

Referring to FIG. 1, a medical image filing and reproducing system is basically composed of an image processing apparatus 30, an image filing apparatus 50, and an image output apparatus 70. The image filing apparatus 50 is constituted by a system control device 51, an optical disk device 52, and an operating console 61 consisting of a keyboard 61A and a display device 61B which may be a cathode ray tube (CRT) or the like.

The image processing apparatus 30 is connected to a radiation image recording and read-out apparatus 10 as an example of an image signal source. The radiation image recording and read-out apparatus 10 may be of the type as disclosed in, for example, Japanese Unexamined Patent Publication No. 61(1986)-29834 or 61(1986)-94035, wherein stimulable phosphor sheets 11, 11 are conveyed and circulated along a circulation path 12, and the stimulable phosphor sheet 11 stopped at the position facing an image recording stand 13 is exposed to a radiation 15 emanated by a radiation source 14 to have an image of an object (patient) 16 stored on the sheet 11. The stimulable phosphor sheet 11 carrying the radiation image stored thereon is conveyed to an image read-out section and two-dimensionally scanned with a laser beam 18 emanated by a laser beam source 17 and deflected by a light deflector 19. As the stimulable phosphor sheet 11 is exposed to the laser beam 18 as stimulating rays, the exposed portion of the sheet 11 emits light in proportion to the stored radiation energy. The emitted light is photoelectrically detected by a photodetector 21 constituted by a photomultiplier or the like via a light guide member 20. The analog output signals of the photodetector 21 are amplified, A/D converted, and output as digital image signals S1 representing the radiation image of the object 16 from the radiation image recording and read-out apparatus 10. After the image read-out is finished in this manner, the stimulable phosphor sheet 11 is sent to an erasing section 22, where the sheet 11 is exposed to erasing light and the radiation energy remaining thereon is erased to such an extent that the sheet 11 is reusable for radiation image recording.

The radiation image recording and read-out apparatus 10 is connected to an ID terminal 25 at which information written on an ID card 26 of the patient 16 (hereinafter referred to as patient information), i.e. the information on name, sex, date of birth, or the like of the patient, is read out. Also, various conditions with regard to the radiation image recording (hereinafter referred to as image recording information), i.e. the information on the image number, the date of image recording, the image recording portion of the object, the image recording size, the read-out sensitivity, or the like are entered at the ID terminal 25. The patient information S2 and the image recording information S3 are fed to the image processing apparatus 30 together with the image signals S1.

The image processing apparatus 30 is constituted so that, for example, not less than 20 types of gradation processings and not less than 10 types of frequency response processings can be effected for the digital image signals S1. The image processing conditions are tabulated, and optimal image processing conditions are automatically selected from the table in accordance with the image recording conditions specified at the ID terminal 25. Image signals S1' obtained by carrying out an image processing by use of optimal conditions in the image processing apparatus 30 are sent to the image output apparatus 70.

By way of example, the image output apparatus 70 is composed of a light beam scanning and recording apparatus for two-dimensionally scanning a photographic film with a light beam modulated with the image signals S1', and an automatic developing machine for developing the exposed film. By the light beam scanning and recording, the image which the image signals S1' represent, i.e. the radiation image of the patient 16, is recorded as a hard copy 71 on the photographic film.

The hard copy 71 of the radiation image formed by use of the photographic film as mentioned above is utilized for diagnosis of the patient 16. Besides the aforesaid configuration, a CRT display device or the like may be used as the image output apparatus 70.

Filing of the radiation image by the image filing apparatus 50 will be described hereinbelow. The system control device 51 of the image filing apparatus 50 is constituted by a known computer system and composed of a central processing unit (CPU) 53, a memory 54, interfaces 55 and 56, a disk drive controller 57, a bus 58 for connecting these sections, a magnetic disk drive unit 59, and a floppy disk drive unit 60. The aforesaid keyboard 61A and the display device 61B are connected to the CPU 53, and the interface 55 is connected to an interface 31 of the image processing apparatus 30. On the other hand, the optical disk device 52 is composed of an interface 62 connected to the interface 56 of the system control device 51, an optical disk drive controller 63, and an optical disk drive unit 64.

The aforesaid patient information S2 and the image recording information S3 are transferred from the image processing apparatus 30 to the system control device 51, and sequentially recorded on a magnetic disk 65 operated by the magnetic disk drive unit 59, thereby to construct a data base. A floppy disk 66 operated by the floppy disk drive unit 60 is utilized for control of system operation. The patient information S2 and the image recording information S3 are also transferred to the optical disk device 52, and filed on an optical disk 67 operated by the optical disk drive unit 64 together with the image signals S1 transferred from the image processing apparatus 30. At this time, the image signals S1 by-pass the image processing section in the image processing apparatus 30, and are recorded on the optical disk 67 as raw signals which have not been subjected to the image processing.

Figure 2:
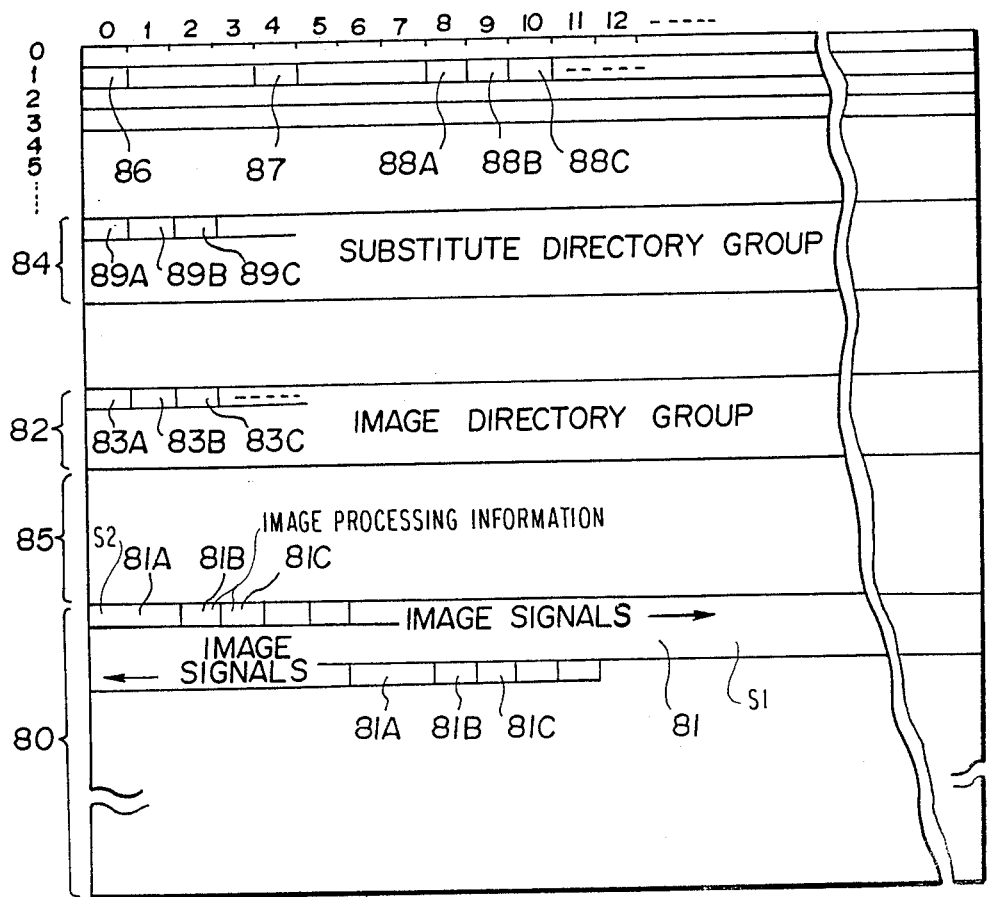
FIG. 2 is an explanatory view showing the recording format of an optical disk used in the medical image filing and reproducing system shown in FIG. 1.

Recording of the image signals S1, the patient information S2, and the image recording information S3 on the optical disk 67 will now be described in detail with reference to FIG. 2 showing the recording format of the optical disk 67. In FIG. 2, each graduation along the vertical axis indicates a single track on the optical disk 67, and each graduation along the horizontal axis indicates a single sector. The image signals S1 are recorded in the unit of a single image in an image signal recording region 80 which is sufficiently broadly formed on the optical disk 67. As is well known, signal recording is effected based on formation of pits on the surface of the optical disk 67. A header 81A where the patient information S2 and the image recording information S3 corresponding to the image signals S1 representing a single image in an image signal area 81 are to be recorded, and blocks 81B and 81C where the image processing conditions for use in the image processing apparatus 30 are to be recorded, are disposed before and after the image signal area 81 for the single image. In this embodiment, in order to cope with the case where an image having an image quality similar to the image quality of the conventional X-ray image and an image having an image quality different from and improved over said image quality, in particular having a higher diagnostic efficiency and accuracy, are to be reproduced side by side respectively on the left and right halves of a single photographic film, the image processing conditions for the image which is to be recorded on the left half of the photographic film are recorded in the block 81B, and the image processing conditions for the image which is to be recorded on the right half of the photographic film are recorded in the block 81C. These image processing conditions are identical with the image processing conditions which were used for processing the image signals S1 in the image processing apparatus 30 in the course of reproducing the images by immediately sending the image signals S1 to the image output apparatus 70.

Transfer of the image processing conditions to the optical disk device 52 will hereinbelow be described in detail. When the medical image filing and reproducing system is started at the beginning of the day's work for example, the image processing information of the image processing tables in the image processing apparatus 30 is transferred to the system control device 51. Many image processing tables are prepared for large numbers of the image processing conditions, for example, not less than 20 types of the gradation processings and not less than 10 types of frequency response processings, in the image processing apparatus 30. All of the image processing information of the respective image processing tables is sent to the system control device 51, and stored in the memory 54 together with table identification numbers. When the image signals S1 representing a single image are fed to the image output apparatus 70 via the image processing apparatus 30, the identification number of the image processing table used in the image processing apparatus 30 is reported from the image processing apparatus 30 to the system control device 51. Reporting of the table identification number is effected for all of the image processing tables used (of course, a single table is used for one type of image processing). Upon receiving the report of the table identification number, the system control device 51 reads the image processing information of the image processing table represented by the table identification number from the memory 54, and sends it to the optical disk device 52. In the optical disk device 52, the image processing information of the image processing table received from the system control device 51 is stored in the blocks 81B and 81C as mentioned above. In this embodiment, recording reliability is increased by providing the header 81A and the blocks 81B and 81C for recording the image processing conditions before and after the image signal area 81.

When the image signals S1 have been recorded in the image signal area 81 on the optical disk 67 in the manner as mentioned above, one of image directories 83A, 83B, 83C, ... that corresponds to the image signals S1 in the image signal area 81 is recorded in an image directory region 82. Basically, in each of the image directories 83A, 83B, 83C, ... the head address of the header 81A for the image signals S1 in the image signal area 81, the sector length of the image signals S1 in the image signal area 81, and characteristic information on the image signals S1 in the image signal area 81 are recorded.

Besides the image signal recording region 80 and the image directory region 82, the optical disk 67 is also provided with a region 84 for forming substitute directories 89A, 89B, 89C, ... used for substitution for the image directories 83A, 83B, 83C, ... when they are changed, and a region 85 for forming directories of new recorded signals representing information on a diagnosis card or the like. Also, on the first track of the optical disk 67, there are formed a block 86 where the serial number of each optical disk 67 and a disk surface identification code are to be recorded, a block 87 for indication of the full status of the optical disk 67, and many directory entry blocks 88A, 88B, 88C, .... The first directory entry block 88A is used for indicating that a group of the image directories 83A, 83B, 83C, ... have been formed. The head address and the sector length of the image directory group (i.e. the group of directories formed in the image directory region 82) are recorded in the first directory entry block 88A. In the second directory entry block 88B, the head address and the sector length of the substitute directory group (89A, 89B, 89C, ...) are recorded. Also, the third directory entry block 88C and the subsequent directory entry blocks are formed for recording head addresses and sector lengths of directory groups for the future.

In the manner as mentioned above, the image signals S1 are sequentially recorded in the unit of a single image on the optical disk 67, and the patient information S2, the image recording information S3, and the image processing signals are sequentially recorded thereon in conformity with the image signals S1 representing each image. In order to increase the number of images capable of being filed on the optical disk 67, the image signals S1 should preferably be compressed by a known image signal compression technique before being recorded on the optical disk 67. Though very large amounts of the image signals S1 are recorded on the optical disk 67 besides the patient information S2 and the image recording information S3, approximately 1,000 images can be filed on a single optical disk 67 when the image signal compression technique is applied. On the other hand, the recording capacity of the magnetic disk 65 is smaller than the recording capacity of the optical disk 67. However, only the patient information S2 and the image recording information S3 are recorded on the magnetic disk 65, and therefore the patient information S2 and the image recording information S3 on approximately 1,000,000 images can be filed thereon for example.

Image retrieval and re-output will now be described below. As mentioned above, the data base for image retrieval has been constructed by the patient information S2 and the image recording information S3 filed on the magnetic disk 65. Image retrieval operators operate the keyboard 61A to enter desired retrieval information by observing the display device 61B of the operating console 61. The system control device 51 retrieves images corresponding to the entered retrieval information from the data base constructed on the magnetic disk 65, and displays a list of the images on the display device 61B. Basically, as the retrieval information, all items of the patient information S2 and the image recording information S3 can be used. For example, when the names of a patient among the patient information S2 are designated as the retrieval information, an image list indicating the image numbers of all images of the designated patient, the patient information S2 other than the names of the patient, and the image recording information S3 is displayed on the display device 61B. The retrieval operators select a desired image from the displayed image list, and request the re-output of the image. The requested image number is stored in the memory 54. In this manner, the image retrieval operation can be completed in advance even though the image processing apparatus 30 and the image output apparatus 70 are in operation for immediately reproducing an image by use of the image signals S1 received from the radiation image recording and read-out apparatus 10. Also, even though the retrieved image is the one recorded on an optical disk different from the optical disk 67 loaded on the optical disk device 52 at the time of the image retrieval, the retrieval operation carried out as mentioned above does not become invalid, and image re-output can be started subsequently by loading the optical disk device 52 with the optical disk carrying the requested image recorded thereon after the aforesaid request was carried out.

When information indicating the stop of the operation of the image processing apparatus 30 is entered to the system control device 51 after the aforesaid request, the system control device 51 activates the optical disk device 52 to read out the image signals representing the requested image from the optical disk 67. In the course of the image signal read-out, an instruction for read-out of the image directory group in the region 82 is given with the first directory entry block 88A acting as a pointer, and the image directories 83A, 83B, 83C, . . . are read out. Also, one of the image directories 83A, 83B, 83C, . . . in which the requested image number is written acts as a pointer, and the header 81A indicated by said image directory is designated. In this manner, the information written in the header 81A, the image signals S1 written in the image signal area 81, and the information written in the blocks 81B and 81C corresponding to the header 81A are read out.

The image signals S1 in the image signal area 81, the patient information S2 and the image recording information S3 in the header 81A, and the image processing information of the image processing table in the blocks 81B and 81C, which have been read out in the manner as mentioned above, are transferred from the system control device 51 to the image processing apparatus 30. The image signals S1 are subjected in the image processing apparatus 30 to an image processing such as a gradation processing or a frequency response processing by use of the image processing conditions which the aforesaid image processing information represents, and the processed image signals S1' are sent to the image output apparatus 70. In the image output apparatus 70, the image is reproduced in the same manner as mentioned above by use of the processed image signals S1', and a hard copy 71 of the radiation image is formed. The patient information S2 and the image recording information S3 are utilized for writing the patient information and the image recording information on the hard copy 71.

In the course of the re-output of the radiation image, image processing is carried out based on the image processing information of the image processing table read out from the blocks 81B and 81C. As mentioned above, the image processing information represents the image processing conditions used for the image processing actually carried out in the course of immediately reproducing the radiation image by use of the image signals S1 corresponding to said image processing information. Therefore, when the image processing is carried out by use of the conditions represented by said image processing information also in the course of the re-output of the radiation image, the re-output radiation image and the radiation image reproduced immediately as mentioned above are processed by use of exactly the same image processing conditions, and therefore exhibit identical image qualities.

Also, since the image processing information of the image processing table is stored on the optical disk 67 in conformity with the image signals S1 representing each image, it is possible to eliminate the problems arising when the image signals S1 are recorded on the optical disk 67 in conformity with the identification number of the image processing table, i.e. the problems that, even though the same identification number of the image processing table is designated between the case where the radiation image is reproduced immediately and the case where the radiation image is re-output by use of the filed image signals S1, the image qualities of both radiation images become different from each other because of alteration of the image processing table effected between the immediate reproduction of the radiation image and the image re-output.

In the aforesaid embodiment, the image processing information of all image processing tables is transferred from the image processing apparatus 30 to the system control device 51 and stored in the memory 54 when the medical image filing and reproducing system is started at the beginning of the day's work. Also, the identification number of the image processing table used in the image processing apparatus 30 is reported to the system control device 51, and the image processing information of the image processing table of the reported identification number is read out from the memory 54. Instead, the image processing information of the image processing table used in the image processing apparatus 30 may be transferred sequentially to the system control device 51 in the course of immediately reproducing the radiation image. However, the method employed in the aforesaid embodiment is preferable since the time required for the transfer of the image processing information of the image processing table can be shortened. In the case where the image processing information of all image processing tables is transferred collectively to the system control device 51 at the time of the starting of the medical image filing and reproducing system, the image processing information may be transferred by use of the data line as mentioned above, or may be transferred from the image processing apparatus 30 to the system control device 51 by use of a portable recording medium such as the floppy disk 66.

Though the aforesaid embodiment is applied to the case where the radiation image as one type of the medical images is filed and reproduced, the method of filing and reproducing a medical image in accordance with the present invention is also applicable to the case where the medical images such as CT images and MR images are to be filed and reproduced.

I claim:

1. In a medical image filing and reproducing system for feeding image signals representing a medical image to an image processing apparatus and an image filing apparatus, reproducing the medical image as a visible image by feeding the image signals processed in the image processing apparatus to an image output apparatus and, also, filing the image signals fed to the image filing apparatus on a recording medium in the image filing apparatus so that the filed image signals are retrievable and transferable to the image output apparatus, a method of filing and reproducing a medical image, which comprises the steps of:

(i) feeding image processing information representing image processing conditions in said image processing apparatus to said image filing apparatus and storing said image processing information on said recording medium in conformity with said image signals which are to be processed by use of said image processing conditions, and (ii) in the course of reading out said image signals from said recording medium and feeding said image signals to said image output apparatus, sending said image signals to said image processing apparatus, reading out said image processing information stored in conformity with said image signals, and setting the image processing conditions, which said image processing information represents, in said image processing apparatus.

2. A method of filing and reproducing a medical image as defined in claim 1 wherein said image signals are compressed before being filed on said recording medium.

3. A method of filing and reproducing a medical image as defined in claim 1 wherein said medical image is a radiation image stored on a stimulable phosphor sheet, and said image signals representing said radiation image are digital image signals obtained by photoelectrically detecting said radiation image.

4. A method of filing and reproducing a medical image as defined in claim 1 wherein said recording medium is an optical disk.

* * * * *